2,956,965

PLASTICIZED PHENOLIC-FORMALDEHYDE RESIN COMPOSITIONS

Robert Steckler, Chagrin Falls, Ohio, assignor to General Aniline & Film Corporation, New York, N.Y., a corporation of Delaware No Drawing. Filed Sept. 5, 1958, Ser. No. 759,122

10 Claims. (Cl. 260—19)

The present invention relates to a plasticized phenolic-formaldehyde resin composition having excellent flexibility and resistance to flaking or cracking.

It is known that phenolic compounds such as phenol per se, resorcinol, alkyl phenols, i.e. cresols, xylenes, phloroglucinol, etc. react with aldehydes (commonly formaldehyde) or ketones to form a variety of products. The nature of the resinous product depends on the choice of the phenolic compound and the aldehyde or ketone and on the conditions of the reaction. Phenolic-formaldehyde resins are of two main types. The resins resemble either the phenol alcohols or the dihydroxydiphenylalkanes in basic structure. If they are prepared with an excess of formaldehyde and an alkaline catalyst they will resemble the phenol alcohols and have methylol side or end groups. The molar ratio of formaldehyde to phenolic compound used may vary in a ratio from 1:1 to 3:1 e.g.:

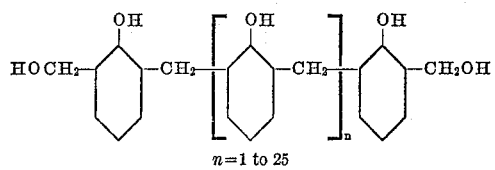

n=1 to 25

Such resins are often referred to as resoles. They are capable of being cured by the application of heat and sometimes acids, cure resulting through condensation of the methylol groups. By cooling the resin the reactions may be conveniently stopped, or at least effectively retarded, anywhere between the addition of the formaldehyde and the final curing process. To resume the reaction, the temperature is raised or an acidic catalyst is added. Since there is no sharp break in these reactions such resins have been termed the one-stage resins.

The majority of the one-stage resins employ formaldehyde as the aldehyde, although certain other aldehydes may be used. Formaldehyde is preferred because of its high reactivity and freedom from side reactions.

On the other hand, if the phenolic resin is prepared with an acidic catalyst and less than a mole of formaldehyde per mole of phenolic compound, the resin will resemble a dihydroxydiphenylmethane in structure, e.g., the chains are phenol ended. The molar ratio of formaldehyde to phenolic compound used may vary anywhere from 1:2 to 1:1, e.g.:

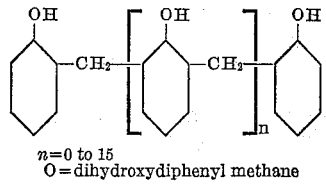

n=0 to 15
0 = dihydroxydiphenyl methane

The resins, commonly referred to as novolak, are permanently soluble and fusible and will cure upon the addition of formaldehyde (in the form of paraformaldehyde), or hexamethylenetetramine. As the preparation of the novolak resin represents one process and the addition of the curing agent represents a separate and distinct process, resins based on a novolak resin and a curing agent are referred to as two-stage resins.

Thermosetting phenolic-formaldehyde resins have certain inherent drawbacks which prevent their full commercial use as coating materials for the formation of films. In other words, such resins are brittle and have extremely poor resistance to flaking or cracking. These drawbacks are attributable to the lack of flexibility, elongation and adhesion of the cured film resulting from such phenolic-formaldehyde resins. Attempts to overcome these defects by incorporating any of the commercially available plasticizers yielded no improved results. Dioctyl phthalate, which is one of the most versatile plasticizers for various types of resins, proved ineffective in imparting flexibility and resistance to flaking or cracking of phenolic-formaldehyde resins.

It is an object of this invention to overcome the foregoing difficulties and to provide a plasticized phenolic-formaldehyde resin which possesses excellent flexibility, elongation, and resistance to flaking or cracking.

Other objects and advantages will become more clearly apparent from the following specification.

I have found that phenolic-formaldehyde resins of the foregoing type, i.e. prepared from any phenolic compound such as phenol, alkylated phenol, e.g. m- and p-cresols, resorcinol, phloroglucinol, xylenol, etc. and formaldehyde, are successfully plasticized by employing a mixture of 30–100 parts by weight of dioctyl phthalate and 1–15 parts by weight of an organic titanium chelate per 100 parts by weight, based on the non-volatile content, of a phenolic-formaldehyde resin. It is to be noted that such resins are prepared in solution form, i.e. in volatile solvents such as the lower alcohols, ketones, etc. Films cast from such a mixture containing the dioctyl phthalate and chelate and whether further diluted or not by solvent diluents such as ketones, alcohols, dioxane, etc., display excellent flexibility and resistance to flaking or cracking. The dioctyl phthalate (prepared by reacting 2 moles of 2-ethyl-hexanol with 1 mole of phthalic acid or its anhydride) and the organic titanium chelate is merely blended in the aforestated ratios with the phenolic-formaldehyde resin and the resulting composition employed in the preparation of coatings, films, etc., in the well known manner.

The phenolic-formaldehyde resins employed in accordance with the present invention are readily available on the open market and the procedure for their preparation is well known to those skilled in the art. As a consequence, references to literature or patents need not be made herein. However, for purposes of illustration, a procedure which yields a phenolic-formaldehyde resin soluble in lower alcohols such as methanol, ethanol, n-propanol or isopropanol, or ketones, glycol ethers, dioxane, and similar polar solvents is as follows:

To a 3-necked resin flask, equipped with a stirrer, thermometer and reflux condenser, were added 927 parts by weight of phenol, 927 parts by weight of formaldehyde (40% aqueous solution) and 10 parts by weight of concentrated ammonia. The mixture was refluxed with agitation until a drop of the reaction mixture cures into a resinous mass on a hot plate at a temperature of 200° C. in 1½ seconds. When this stage is reached, the resin is then dehydrated at 50° C. and 26" vacuum for a period of 3½ hours during which the temperature is finally raised to 100° C. The resin is then dissolved in a lower alcohol such as methanol, ethanol, isopropanol to yield a 45-70% solution, preferably a 50% solution. In this case, ethanol was employed as the solvent to yield a 50% solution. The resulting phenolic-formaldehyde resin in solution is of the phenol-alcohol type.

The following examples will illustrate the various ways in which the foregoing phenolic-formaldehyde resin may be plasticized to yield a composition which in film form possesses excellent flexibility and resistance to flaking or cracking. All parts given are by weight.

*Example I*

A film of the above resin (without plasticization) was cast on a 20 gauge automotive steel panel while employing a gauge with a 5 mil clearance. After ½ hour of air drying, the film was baked for a period of ½ hour at a temperature of 175° C. The cured film had a thickness of approximately 1 mil. The film was then evaluated for flexibility while employing a General Electric impact-flexibility tester and was found to give an impact elongation of 1%. This low figure is clearly indicative of a very brittle, poorly plasticized film.

The foregoing flexibility tester is commercially available on the open market and entails a solid metal cylinder which is dropped through a guide trap from a slide of approximately 4 feet. The impactor strikes the reverse side of the coated test panel which is supported by a rubber pad so that the circular imprint of the impractor is barely definable in the panel metal. Each end of the impractor is studded with a group of protruding spherical knobs arranged in a circle. After impact, the film is distended according to the curvature of the spherical surface forming a knob. The percentage elongation of the film is a function solely of the geometry of the knob itself, and is not dependent upon the rate of draw, thickness of the metal panel or other dimensions. This apparatus was chosen because it is ideal for testing resin films for their flexibility, either air dried or baked on a metal panel.

*Example II*

To 100 parts of the phenolic-formaldehyde resin as prepared above, were added 30 parts of dioctyl phthalate. A film was cast on a 20 gauge automotive steel panel while using a gauge with a 5 mil clearance. The coated film was air dried for ½ hour followed by baking at 175° C. for ½ hour period. The cured film had a thickness of approximately 1 mil and when evaluated with the General Electric impact elongation tester gave an impact elongation of approximately 20%. This figure indicates a partially plasticized film which is unsuitable wherein resistance to flaking or cracking is a prerequisite.

As stated above, the mixture of dioctyl phthalate and an organic titanium chelate surprisingly effects plasticization of the phenolic-formaldehyde resin to the extent that the films thereof have excellent flexibility and resistance to cracking or flaking. The use of the organic titanium chelate by itself as a plasticizer in the phenolic-formaldehyde resin gives an impact elongation of only ½%. The resulting film is not only poorly plasticized but very brittle. The new and unexpected feature in accordance with the present invention is that when dioctyl phthalate is employed together with the organic titanium chelate in the aforementioned proportions, a synergistic effect is obtained yielding complete plasticization and as a consequence a film cast from the phenolic-formaldehyde resin is extremely resistant to cracking or flaking.

I have found that in addition to titanium, organic zirconium chelates and organic tin chelates produce no beneficial effect whatsoever when employed alone as plasticizers for the phenolic-formaldehyde resins. The same finding was noted when the organic zirconium and tin chelates were used in conjunction with dioctyl phthalate in the aforementioned concentrations. The new and unexpected results which I have found are attributable only to organic titanium chelates when used in conjunction with dioctyl phthalate in the aforementioned concentrations.

The organic titanium chelates that I employ are readily obtained in the usual manner by reacting 1 mole of a titanium ortho ester with 2, 2.2, 3 or 4 moles of either octylene glycol (2-ethylhexanediol-1,3), triethanolamine, triethanolamine-N-salts of fatty acids such as butyric, caproic, caprylic, capric, undecylic, myristic, palmitic, oleic, linoleic, stearic or any of the fatty acids whether saturated or unsaturated so long as they contain from 4 to 18 carbon atoms.

The titanium ortho esters utilized in the preparation of the corresponding chelates are well known and are characterized by the following general formula:

$$Ti(OR)_4$$

wherein R represents an alkyl group of one of the 3 to 18 carbon atoms, e.g. propyl, butyl, hexyl, octyl, nonyl, decyl, dodecyl, cetyl, octadecyl, etc. As illustrations of such titanium ortho esters, many of which are commercially available, I have found the following to be especially adaptable for the preparation of the corresponding chelates:

Tetraisopropyl titanate
Tetra n-butyl titanate
Tetra n-amyl titanate
Tetrahexyl titanate
Tetra-2-ethylhexyl titanate
Tetraheptyl titanate
Tetraoctyl titanate
Tetranonyl titanate
Tetradecyl titanate
Tetrahendecyl titanate
Tetradodecyl titanate
Tetracetyl titanate
Tetrastearyl titanate The organic titanium chelates, all of which are commercially available under various brand or trade names are, as pointed out above, readily obtained by reacting in the conventional manner 2, 2.2, 3 or 4 moles of the chelating compound such as octylene glycol, triethanolamine, a fatty acid salt of triethanolamine or a fatty acid of 3 to 18 carbon atoms with 1 mole of any one of the above titanium ortho esters. The triethanolamine titanate N-salts of fatty acids are readily obtained by reacting 2 moles of triethanolamine with 1 mole of the titanium ester of 1 or 2 moles of a fatty acid. All of the chelates utilized in accordance with the present invention are characterized by the following general formula:

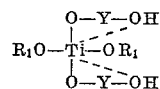

wherein $R_1$ represents either hydrogen or an alkyl radical from 3 to 18 carbon atoms and Y represents the chelating radical which is linked to two or more electron donating atoms such as oxygen or hydrogen and characterized by octylene glycol, triethanolamine or a fatty acid. Such titanium chelates can also be prepared by reacting glycols of 4 to 8 carbon atoms or amino alcohols such as triethanolamine in ratios of 2, 2.2, 3 or 4 moles per mole of titanium ortho-ester. The titanium chelates based on amino alcohols can be further reacted with partial or complete neutralization with fatty acids of 3 to 18 carbon atoms.

As examples of titanium chelates that may be used in conjunction with dioctyl phthalate, the following are illustrative:

| Organic Titanium Chelate | Molar Proportions | | | Employed as solution |
|---|---|---|---|---|
| | Chelating Compound | Ti | Acid | |
| 1. Octylene glycol titanate (OGT-21) [1] | 2 moles Octylene glycol (2-ethyl-hexanediol-1,3). | 1 | | 40% in butanol. |
| 2. Octylene glycol titanate (OGT-2.21) | 2.2 moles Octylene glycol (2-ethyl-hexanediol-1,3). | 1 | | 38% in butanol. |
| 3. Octylene glycol titanate (OGT-31) | 3 moles Octylene glycol (2-ethyl-hexanediol-1,3). | 1 | | 40% in butanol. |
| 4. Octylene glycol titanate (OGT-41) | 4 moles Octylene glycol (2-ethyl-hexanediol-1,3). | 1 | | Do. |
| 5. Triethanolamine titanate (TAT-21) | 2 moles Triethanolamine | 1 | | 59% in isopropanol. |
| 6. Triethanolamine titanate-N-oleate (TAT-O-211). | do | 1 | 1 oleic | Do. |
| 7. Triethanolamine titanate-N-oleate (TAT-O-212). | do | 1 | 2 oleic | Do. |
| 8. Triethanolamine titanate-N-stearate (TAT-S-211). | do | 1 | 1 stearic | Do. |
| 9. Triethanolamine titanate-N-linseed acids salt (TAT-L-211). | do | 1 | 1 Linseed fatty acid. | Do. |

[1] Trade name.

Example III

To 100 parts of the phenol-formaldehyde resin prepared as above, were added 15 parts of octylene glycol titanate 2.21. The mixture was stirred and a film cast in the same manner as in Example I. The dried and cured film gave an impact elongation of ½% thus indicating a poorly plasticized and very brittle film.

Example IV

In order to determine the synergistic effect of a mixture of dioctyl phthalate with organic titanium chelates, a large batch of phenolic-formaldehyde resin was prepared in accordance with the foregoing procedure as a 50% solution in ethanol. In addition, a sufficient quantity of a commercially available phenolic-formaldehyde resin solution, sold under the brand name of Resinox P-97 (50% of resin in ethanol), was obtained and utilized for test purposes. Both the commercially available phenolic-formaldehyde resin and that prepared in accordance with the foregoing procedure were allocated into separate 100 parts by weight portions to which were added a mixture of dioctyl phthalate and the solution of organic titanium chelate in various proportions. The resulting solutions were cast as in Example I and then evaluated on the General Electric elongation tester. The results obtained are tabulated in the following table:

| Organic Titanium Chelate No.: | Parts | Dioctyl Phthalate, Parts | Parts of Phenolformaldehyde Resin of Illustration solution based on non-volatile content | Parts of Resinox P-97 Solution based on non-volatile content | Percent G. E. Impact Elongation |
|---|---|---|---|---|---|
| 1 | 1 | 30 | 100 | | 40 |
| 2 | 5 | 30 | | 100 | 60 |
| 3 | 10 | 30 | 100 | | 60 |
| 4 | 15 | 30 | | 100 | 60 |
| 5 | 10 | 35 | 100 | | 60 |
| 6 | 5 | 30 | | 100 | 60 |
| 7 | 10 | 35 | | 100 | 60 |
| 8 | 10 | 35 | | 100 | 60 |
| 9 | 15 | 30 | 100 | | 60 |

From the foregoing table it becomes clearly manifest that a mixture of at least 30 parts by weight of dioctyl phthalate and 1 to 15 parts by weight of the organic titanium chelate per 100 parts of the phenolic-formaldehyde resin containing 100% solids yields exceptionally good plasticized films possessing excellent resistance to cracking or flaking. The higher percent of elongation is always indicative of a very well plasticized film.

In order to determine what effect varying amounts of the organic titanium chelate would have on a finished film, 9 separate solutions in ethanol were prepared in accordance with the foregoing procedure and the following results obtained:

| Components | All parts by weight based on non-volatile basis | | | | | | | | |
|---|---|---|---|---|---|---|---|---|---|
| | Solution | | | | | | | | |
| | 1 | 2 | 3 | 4 | 5 | 6 | 7 | 8 | 9 |
| Resinox P-97 | 67 | 67 | 67 | 67 | 67 | 67 | 67 | 67 | 67 |
| Dioctyl phthalate | 33 | 33 | 33 | 33 | 33 | 33 | 48 | 43 | 40 |
| Octylene glycol titanate (OGT-2.21) | 0 | 1.0 | 2.5 | 5.0 | 10.0 | 15.0 | 0 | 5.0 | 0 |
| G.E. Impact Elongation, percent | 20 | 40 | 40 | over 60 | over 60 | over 60 | 20 | over 60 | 20 |

From the above results, it is clearly evident that increasing the dioctyl phthalate without the presence of the chelate yields poorly plasticized films. As little as 1 part of the chelate per 33 parts of dioctyl phthalate gives decidedly superior results.

Instead of employing straight alcohol solutions of the phenolic-formaldehyde resins, it is possible to incorporate various fillers and pigments in addition to the dioctyl phthalate and organic titanium chelates to yield compositions having many desirable properties wherein flexibility and resistance to cracking or flaking are necessary prerequisites. The resulting coating compositions are particularly adaptable as bake on enamels. After spray coating application, the enamel is baked for 20-45 minutes at a temperature of 165°-180° C., preferably at 175° C.

I claim:

1. A heat curable coating composition comprising 100 parts by weight of a phenol-formaldehyde resin, 30 to 100 parts by weight of dioctylphthalate, and 1 to 15 parts by weight of an organic titanium chelate having the following general formula:

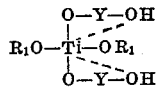

wherein $R_1$ represents a member selected from the class consisting of hydrogen and an alkyl group of from 3 to 18 carbon atoms, and Y represents a chelating radical selected from the class consisting of the radical of octylene glycol and

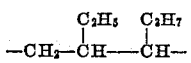

and

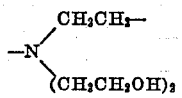

2. A heat curable coating composition according to claim 1 wherein the chelating radical is

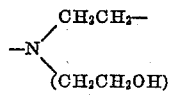

3. A heat curable coating composition according to claim 2 wherein the triethanolamine chelate radical is neutralized with a fatty acid of from 3 to 18 carbon atoms.

4. A heat curable coating composition according to claim 3 wherein the fatty acid is oleic acid.

5. A heat curable coating composition according to claim 3 wherein the fatty acid is stearic acid.

6. A process of obtaining a heat cured film having flexibility and resistance to flaking and cracking consisting of coating a surface with a composition comprising 100 parts by weight of phenol-formaldehyde resin, 30 to 100 parts by weight of dioctylphthalate, and 1 to 15 parts by weight of an organic titanium chelate having the following general formula:

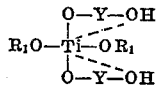

wherein $R_1$ represents a member selected from the class consisting of hydrogen and an alkyl group of from 3 to 18 carbon atoms, and Y represents a chelating radical selected from the class consisting of the radical of octylene glycol and

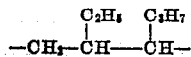

and

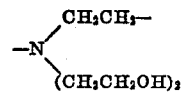

7. The process according to claim 6 wherein the chelating radical is

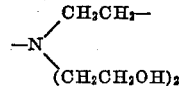

8. The process according to claim 7 wherein the triethanolamine chelate radical is neutralized with a fatty acid of from 3 to 18 carbon atoms.

9. The process according to claim 8 wherein the fatty acid is oleic acid.

10. The process according to claim 8 wherein the fatty acid is stearic acid.

References Cited in the file of this patent

UNITED STATES PATENTS 2,643,262     Bostwick _____ June 23, 1953

OTHER REFERENCES

Esters of Titanium, Paint Manufacture, pp. 463–465, December 1956.